United States Patent [19]

Carranza et al.

[11] Patent Number: 4,620,385
[45] Date of Patent: Nov. 4, 1986

[54] ROTATABLE WINGS FOR WATER FOWL DECOYS

[76] Inventors: Thomas G. Carranza; Luis Carranza, both of 910 Globe, Houston, Tex. 77034

[21] Appl. No.: 725,896

[22] Filed: Apr. 22, 1985

[51] Int. Cl.$^4$ .......................................... A01M 31/06
[52] U.S. Cl. ........................................ 43/3; 446/154; 446/199; 446/217; 446/218; 446/236
[58] Field of Search .................. 43/2, 3; 446/154, 199, 446/201, 217, 218, 236

[56] References Cited

U.S. PATENT DOCUMENTS

| 128,869 | 7/1872 | Ffolliott | 446/199 |
| 146,334 | 1/1874 | Hagstrom | 446/217 X |
| 2,485,053 | 10/1949 | Layfield | 43/42.13 |
| 2,542,622 | 2/1951 | Bordner | 43/42.12 X |
| 2,545,801 | 3/1951 | Wrazen | 446/199 X |
| 2,692,451 | 10/1954 | Deuster | 43/3 X |
| 2,711,613 | 6/1955 | Brown | 446/199 |
| 2,747,316 | 5/1956 | Benedetto | 43/3 |
| 3,435,550 | 4/1969 | Carlson | 43/3 |
| 3,736,688 | 6/1973 | Caccamo | 43/3 |

Primary Examiner—Nicholas P. Godici
Assistant Examiner—Carmine Cuda
Attorney, Agent, or Firm—Kenneth A. Roddy

[57] ABSTRACT

A pair of rotatable wings are slidably and rotatably received and secured on the axle of a bracket carried by a water fowl decoy to extend laterally outward from the decoy body. The wings have a series of circumferentially spaced blades which are shaped to cause rotation of the wings when subjected to a slight breeze and produce an alternating visual signal upon rotation. The bracket may be releasably attached to the decoy or molded into the decoy body during manufacture.

12 Claims, 3 Drawing Figures

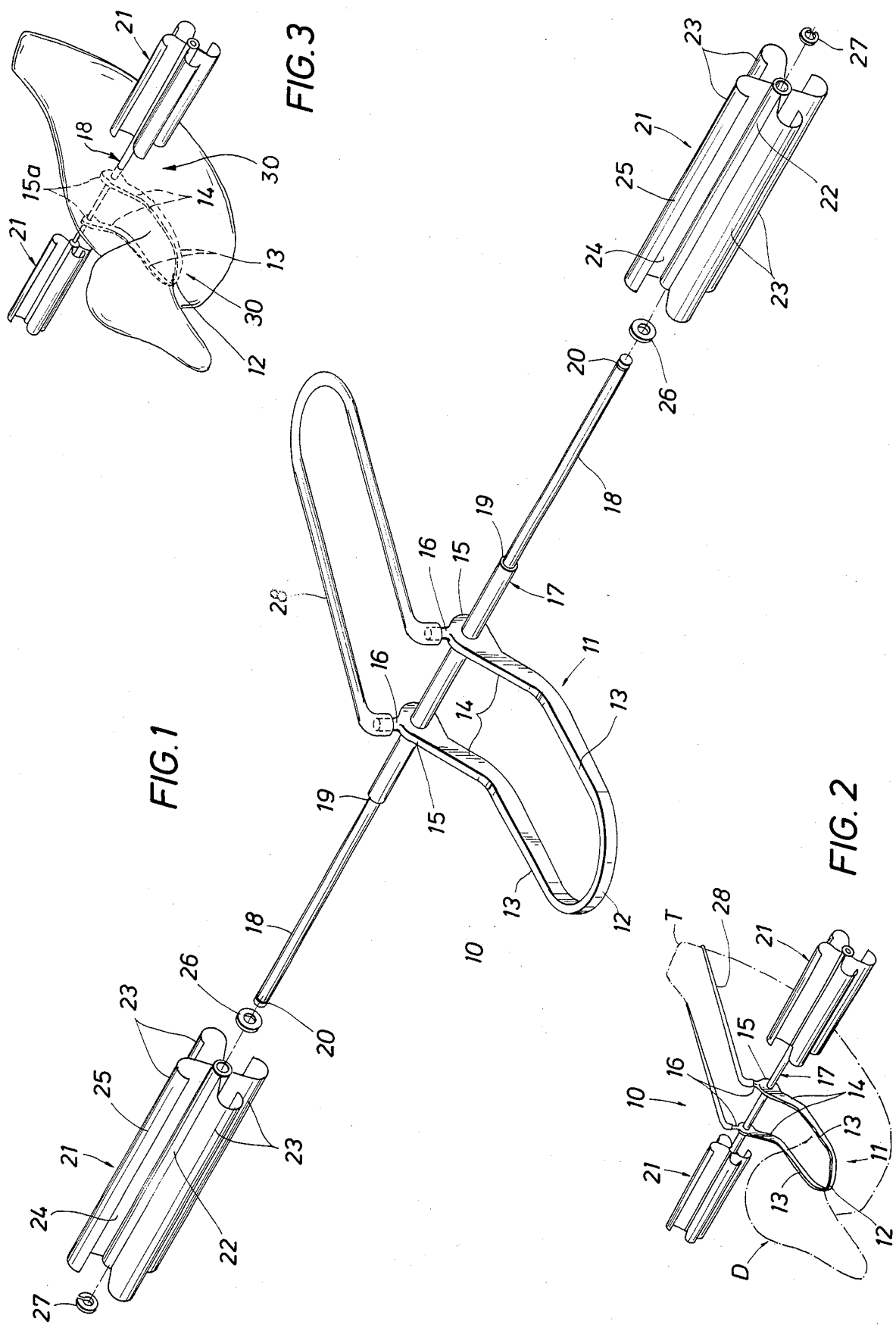

ROTATABLE WINGS FOR WATER FOWL DECOYS

BACKGROUND OF THE INVENTION

1. Field of the Invention

This invention relates generally to water fowl decoys, and more particularly to rotatable wings for water fowl decoys actuated by wind to attract live birds.

2. Brief Description of the Prior Art

Movable wings for water fowl decoys are known in the art. There are several patents which disclose various decoys and wing constructions which simulate the action of live birds.

Snow, U.S. Pat. No. 4,128,958 discloses a decoy having movable wings mounted on the side of the body and controlled by strings or other flexible members external to the body and manipulated from a remote location when the decoy is anchored in place. The wings can be moved from a retracted position to an operative position in which the wings are made to move up and down in a flapping motion to simulate the actions of a live bird.

Christmas, U.S. Pat. No. 2,909,859 discloses a decoy having movable wings which are attached to a bellows within the body and controlled by a squeeze bulb connected to a flexible line external to the body and manipulated from a remote location. The wings move up and down in a flapping motion.

Benedetto, U.S. Pat. No. 2,747,316 discloses a wing construction which is removably attached to existing decoys and which is automatically actuated to cause the wings to move in a flapping motion when the decoy bobs in the water.

Caccamo, U.S. Pat. Nos. 3,736,688 and 3,768,192 disclose a means for animating an existing decoy by pivotally attaching it to a flexible arm.

The following patents of interest disclose decoys having movable wings controlled by strings or other flexible members external to the body and manipulated from a remote location; Robert, U.S. Pat. No. 3,537,205, Carlson, U.S. Pat. No. 3,435,550, Rullson, U.S. Pat. No. 2,413,418, and Trimble, U.S. Pat. No. 378,410.

The prior art in general, and none of these patents in particular, disclose decoys having rotatable wings nor do they suggest the present invention of a pair of rotatable wings rotatably received and secured on the axle of a bracket carried by the decoy to extend laterally outward from the decoy body. The wings have a series of circumferentially spaced blades which are shaped to cause rotation of the wings when subjected to a slight breeze and produce an alternating visual signal upon rotation.

SUMMARY OF THE INVENTION

It is therefore an object of the present invention to provide rotatable wings for water fowl decoys which when rotating will produce a visual flashing signal which is detected at greater distances than conventional moving wings.

It is another object of this invention is to provide rotatable wings for water fowl decoys which when rotating will produce a bright visual flashing signal simulating movement which is detected at great distances to attract a greater number of live birds.

Another object of this invention is to provide rotatable wings which are easily installed and require no external connections requiring manipulation by the hunter from a remote location.

Another object of this invention is to provide rotatable wings for water fowl decoys which will rotate responsive to a slight breeze and when subjected to strong winds will cause the decoy to move.

A further object of this invention is to provide rotatable wings for water fowl decoys are simple in construction and operation, rugged and durable in use, economical to manufacture, and attractive in appearance.

Other objects of the invention will become apparent from time to time throughout the specification and claims of hereinafter related.

The above noted objects and other objects of the invention are accomplished by a pair of rotatable wings rotatably received and secured on the axle of a bracket carried by the decoy to extend laterally outward from the decoy body. The wings have a series of circumferentially spaced blades which are shaped to cause rotation of the wings when subjected to a slight breeze and produce an alternating visual signal upon rotation.

BRIEF DESCRIPTION OF THE DRAWINGS

FIG. 1 is an exploded isometric view of the rotating wings in accordance with the present invention.

FIG. 2 is an isometric view of the rotating wings removably installed on a decoy.

FIG. 3 is an isometric view of a decoy having the rotating wings molded within the decoy body.

DESCRIPTION OF THE PREFERRED EMBODIMENT

Referring to the drawings by numerals of reference, and particularly to FIG. 1, there is shown a preferred rotating wing assembly 10. The wing assembly 10 comprises a central generally U-shaped bracket 11 having a curved portion 12, and opposed leg portions each formed into an intermediate short straight section 13 extending therefrom, and an adjoining angularly upward extending section 14. The upwardly extending sections 14 terminate in flatened ends 15. A short rod-like protrusion 16 extends vertically from the top portion of each end 15.

A rod-shaped axle member 17 extends transversely between the flatened ends 15, and laterally outward therefrom. The extended ends of the axle member 17 are provided with a reduced diameter portion 18 forming an annular shoulder 19 spaced a short distance outwardly from each flatened end 15. A slot or annular groove 20 is provided near the outer ends of the reduced diameter portions 18.

The wings 21 are comprised of a central longitudinal tubular sleeve 22 of plastic or other suitable low friction material and a plurality of circumferentially spaced air scoops or blades 23 which extend radially outward therefrom. The internal diameter of the sleeve 22 is slightly greater than the reduced diameter portion 18 of the axle 17 to be slidably and rotatably received thereon. The blades 23 extend longitudinally substantially the length of the sleeve 22. The outer edges of the blades 23 are curved sufficient to create an airfoil which causes the sleeve to rotate when subjected to a slight breeze. The blades 23 are formed of light weight material such as plastic.

The front 24 and back 25 surface of each blade is colored in a contrasting color. For example, the front surface may be a shiny light reflecting color such as silver, and the back surface may be a dull light absorbing color such as black or grey. Various combinations may be used to provide an alternating visual signal or flashing signal when the blades are rotating.

To assemble the wings 21 on the axle 17, low friction washers 26 are inserted onto the reduced diameter portions 18 of the axle 17 to reside adjacent the annular shoulders 19. The sleeves 22 are inserted onto the reduced diameter portions 18 of the axle 17 adjacent the washers 26, and a C-clip 27 is secured into the groove 20 at each end to retain the wings 21 onto the axle.

As best shown in FIG. 2, the U-shaped bracket 11 is placed over the head of the decoy D with the curved portion 12 around the neck and the portion of the axle 17 intermediate the flatened ends 15 resting on the back of the decoy. The ends of an elastic band such as a length of surgical tubing 28 are inserted onto the protrusions 16 and the tubing 28 is stretched to fit around the tail portion T of the decoy. In this manner, the wing assembly 10 is removably attached to the decoy by the surgical tubing and the U-shaped bracket maintains the decoy in a balanced position.

Alternatively, the wing assembly may be molded or otherwise conventionally installed within the body during manufacture of the decoy as shown in FIG. 3. In this modification the wing assembly, designated as numeral 30, has a modified bracket 31 which does not require the surgical tubing nor the protrusions for attaching the tubing to the bracket.

The wing assembly 30 comprises a central generally U-shaped bracket 31 having a curved portion 12, and opposed leg portions each formed into an intermediate short straight section 13 extending therefrom, and an adjoining angularly upward extending section 14. The upwardly extending sections 14 terminate in flatened ends 15a.

The reduced diameter portion 18 of the axle 17 extends outwardly of the decoy body. With the exception of the modified bracket, the description of the assembly is the same as previously described and will not be repeated here to avoid repetition, and similar parts are given the same numerals of reference.

OPERATION

The wing assembly of the present invention may be sold in kit form to be installed on existing decoys. The hunter installs a low friction washer onto each reduced diameter of the axle, slides the sleeves of the wings onto the extended ends and places a C-clip at each end. He then places the bracket around the head of the decoy with the axle resting on the back of the decoy. The ends of the surgical tubing is placed onto the protrusions and the tubing is stretched over the tail of the decoy. The decoy is placed into the water, and the wings are free to rotate upon sufficient breeze. When the wings rotate, they produce an alternating visual signal attracts live birds over great distances.

A decoy could also be sold having the bracket molded into the body during manufacture, in which case the hunter merely installs the wings onto the axle as previously described. It should be obvious from the foregoing that the decoy body could be provided with an internal bracket having an aperture to receive an axle which has the wing member assembled thereon.

While this invention has been described fully and completely with special emphasis upon a preferred embodiment, it should be understood that within the scope of the appended claims the invention may be practiced otherwise than as specifically described herein.

We claim:

1. Rotatable wings for water fowl decoys comprising;
   a generally U-shaped bracket adapted to be carried by water fowl decoys and maintain the decoy in a balanced floating position when carried thereby,
   an axle member secured transversly to said bracket with opposing ends extending laterally outward therefrom, and
   a pair of wings slidably and rotatably received and secured on the extended ends of said axle member in laterally opposed relation and each having a series of circumferentially spaced radially extending blade members disposed above the surface of the water and shaped to cause rotation of said wings when subjected to a slight breeze,
   said blade members adapted to produce an alternating visual signal upon rotation which is perceptable by live birds.

2. Rotatable wings for water fowl decoys according to claim 1 wherein
   said wing blade members are parallel to the longitudinal axis of said axle member, and
   said blade members shaped to cause rotation of said wings about the longitudinal axis of said axle member.

3. Rotatable wings for water fowl decoys according to claim 1 wherein
   the front and back surfaces of each said blade member are colored in contrasting colors to produce said alternating visual signal.

4. Rotatable wings for water fowl decoys according to claim 1 wherein
   the front surface of each said blade member is adapted to reflect light and the back surface of each said blade is adapted to absorb light to produce said alternating visual signal.

5. Rotatable wings for water fowl decoys according to claim 1 wherein
   said bracket is removably attached to said decoy to be carried thereby.

6. Rotatable wings for water fowl decoys according to claim 5 wherein
   said bracket is adapted to be received around the neck of said decoy and provided with releasable means for attaching said bracket to said decoy.

7. Rotatable wings for water fowl decoys according to claim 6 wherein
   said releasable means for attaching said bracket to said decoy comprises a length of elastomeric material having each end connected to said bracket and its midsection stretched to fit around the rear portion of said decoy.

8. Rotatable wings for water fowl decoys according to claim 1 wherein
   said bracket is permanently attached to said decoy to be carried thereby.

9. A water fowl decoy comprising;
   a body formed of bouyant material and fashioned to resemble a water fowl,
   said body adapted to receive a rotatable wing at opposing sides, and
   a pair of wings rotatably received and secured on the opposing sides of said body and each having a series of circumferentially spaced radially extending blade members disposed completely above the surface of the water and shaped to cause rotation of said wings when subjected to a slight breeze, said blade members adapted to produce an alternating visual signal upon rotation which is perceptable by live birds.

10. A water fowl decoy according to claim 9 wherein said wings are secured transverse to the longitudinal axis of said body, and said blade members shaped to cause rotation of said wings about the longitudinal axis of said axle member.

11. A water fowl decoy according to claim 9 wherein the front and back surfaces of each said blade member are colored in contrasting colors to produce said alternating visual signal.

12. A water fowl decoy according to claim 9 wherein the front surface of each said blade member is adapted to reflect light and the back surface of each said blade member is adapted to absorb light to produce said alternating visual signal.

* * * * *